US012582916B2

(12) United States Patent
Sekiguchi et al.

(10) Patent No.: US 12,582,916 B2
(45) Date of Patent: Mar. 24, 2026

(54) PROGRAM, INFORMATION PROCESSING DEVICE, METHOD, AND SYSTEM

(71) Applicant: CYGAMES, INC., Tokyo (JP)

(72) Inventors: Kentaro Sekiguchi, Tokyo (JP); Yukio Eguchi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 329 days.

(21) Appl. No.: 18/350,952

(22) Filed: Jul. 12, 2023

(65) Prior Publication Data

US 2023/0347256 A1    Nov. 2, 2023

Related U.S. Application Data

(63) Continuation of application No. PCT/JP2022/000628, filed on Jan. 12, 2022.

(30) Foreign Application Priority Data

Jan. 15, 2021    (JP) ................................. 2021-004896

(51) Int. Cl.
*A63F 13/86*        (2014.01)
*A63F 13/79*        (2014.01)
*A63F 13/35*        (2014.01)

(52) U.S. Cl.
CPC .............. *A63F 13/86* (2014.09); *A63F 13/79* (2014.09); *A63F 13/35* (2014.09)

(58) Field of Classification Search
None
See application file for complete search history.

(56) References Cited

U.S. PATENT DOCUMENTS

2020/0197807 A1* 6/2020 Tieger .................... A63F 13/86
2022/0314127 A1 10/2022 Konishi et al.

FOREIGN PATENT DOCUMENTS

JP        2015-008902 A      1/2015
JP        6783918 B1    11/2020

OTHER PUBLICATIONS

International Search Report issued in PCT/JP2022/000628 on Apr. 12, 2022 (7 pages).

(Continued)

*Primary Examiner* — Damon J Pierce
(74) *Attorney, Agent, or Firm* — Osha Bergman Watanabe & Burton LLP

(57)        ABSTRACT

Provided is a game system 1 that is a system for a game, the system having a plurality of information processing devices 10, the game including a story game and a battle game, battle presentation information with respect to terminal devices 10 of battle players of a battle in the battle game being calculated by using production information for the story game, and the battle being observable at a terminal device 10 of a battle-observation player, at least one of the information processing devices 10 including a battle-observation-presentation-information calculation unit 52 that calculates battle-observation presentation information with respect to the terminal device 10 of the battle-observation player of the battle on the basis of production information based on a progress level of the battle-observation player in the story game and input information related to the battle.

8 Claims, 7 Drawing Sheets

(56) References Cited

OTHER PUBLICATIONS

Written Opinion of the International Searching Authority issued in PCT/JP2022/000628 on Apr. 12, 2022 (4 pages).
Office Action issued in corresponding Japanese Patent Application No. 2021-004896, mailed on Sep. 21, 2021 (6 pages).
"RPG mode system details and progression"; Aug. 15, 2020; Retrieved from the Internet: URL: <https://gamesink.net/gbvs/ar ticles/469> (25 pages).
"Heavy and Light Stages in Online Battles"; May 8, 2020; Retrieved from the Internet: URL: <https://gamesink.net/gbvs/ar ticles/2738> (16 pages).
Enterbrain Inc.; "Blazblue"; Famitsu Xbox 360; vol. 8, No. 5; May 1, 2009; pp. 6-7 (8 pages).

\* cited by examiner

10

16

11

PROCESSOR

14

STORAGE DEVICE

12

INPUT DEVICE

15

COMMUNICATION DEVICE

13

OUTPUT DEVICE

10

INPUT UNIT ~21

OUTPUT UNIT ~22

STORAGE UNIT ~23

COMMUNICATION UNIT ~24

GAME CONTROL UNIT ~25

FIG.4

| STAGE ID | STAGE NAME | PROGRESS LEVEL |
|---|---|---|
| 1 | BATTLE FIELD1 | 0 |
| 2 | BATTLE FIELD2 | 0 |
| 3 | BATTLE FIELD3 | 1 |
| 4 | BATTLE FIELD4 | 2 |
| ⋮ | ⋮ | ⋮ |
| n | BATTLE FIELDn | N |

FIG.5

| STAGE ID | PROGRESS LEVEL | PRODUCTION INFORMATION ID | PRODUCTION INFORMATION |
|---|---|---|---|
| 1 | 0 | 1 | PRODUCTION INFORMATION1 |
| 2 | 0 | 2 | PRODUCTION INFORMATION2 |
| 3 | 1 | 3 | PRODUCTION INFORMATION3 |
| 4 | 2 | 4 | PRODUCTION INFORMATION4 |
| ⋮ | ⋮ | ⋮ | ⋮ |
| n | N | N | PRODUCTION INFORMATION N |

FIG.6

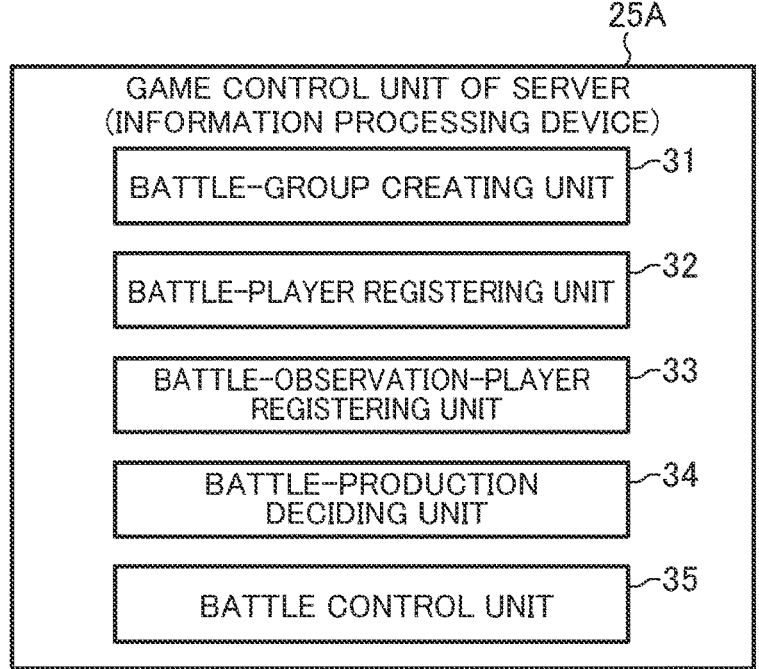

25A

GAME CONTROL UNIT OF SERVER
(INFORMATION PROCESSING DEVICE)

BATTLE-GROUP CREATING UNIT ~31

BATTLE-PLAYER REGISTERING UNIT ~32

BATTLE-OBSERVATION-PLAYER
REGISTERING UNIT ~33

BATTLE-PRODUCTION
DECIDING UNIT ~34

BATTLE CONTROL UNIT ~35

FIG.8

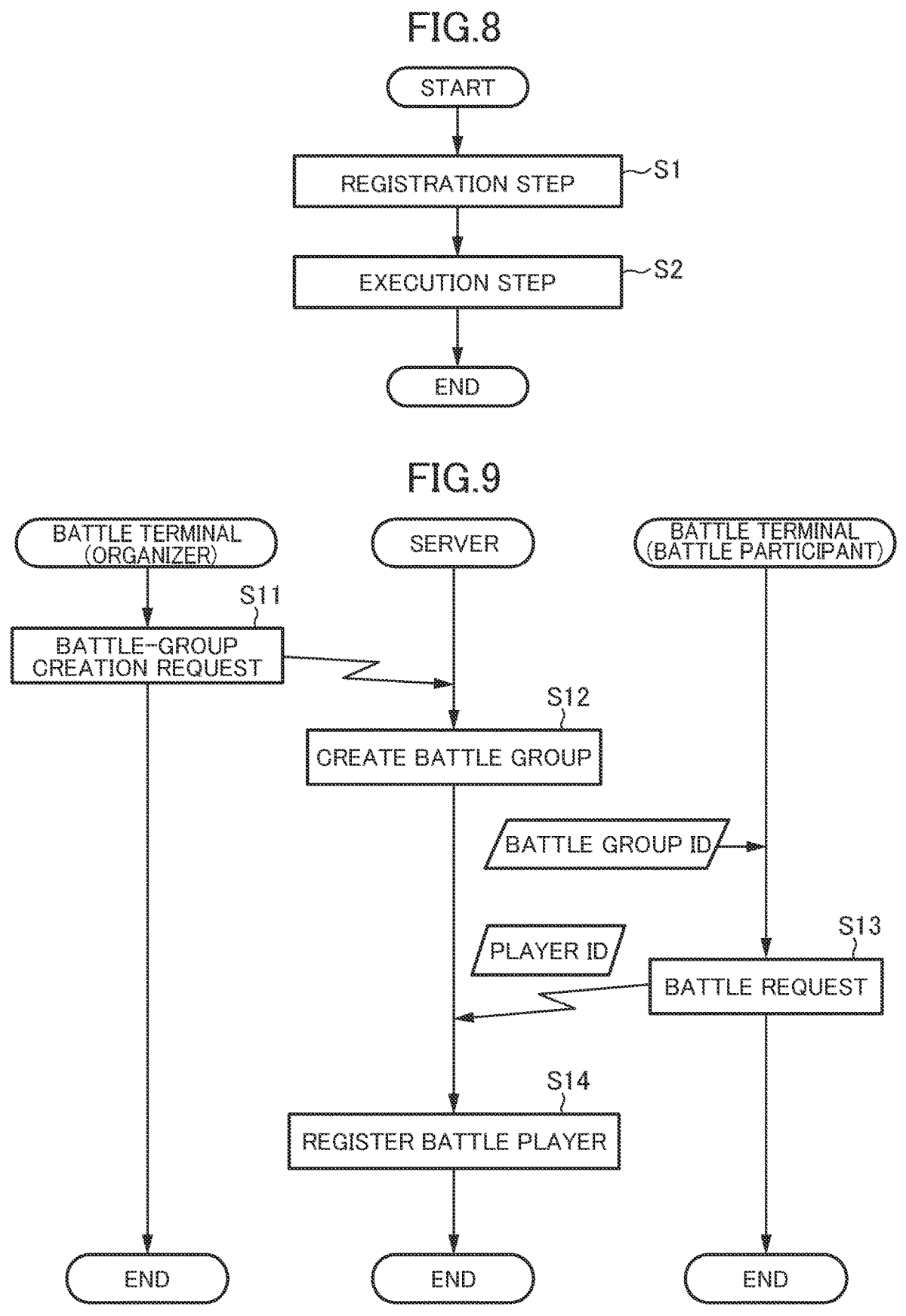

START

REGISTRATION STEP ⸻ S1

EXECUTION STEP ⸻ S2

END

FIG.9

BATTLE TERMINAL
(ORGANIZER)

SERVER

BATTLE TERMINAL
(BATTLE PARTICIPANT)

BATTLE-GROUP
CREATION REQUEST ⸻ S11

CREATE BATTLE GROUP ⸻ S12

BATTLE GROUP ID

PLAYER ID

BATTLE REQUEST ⸻ S13

REGISTER BATTLE PLAYER ⸻ S14

END          END          END

FIG.10

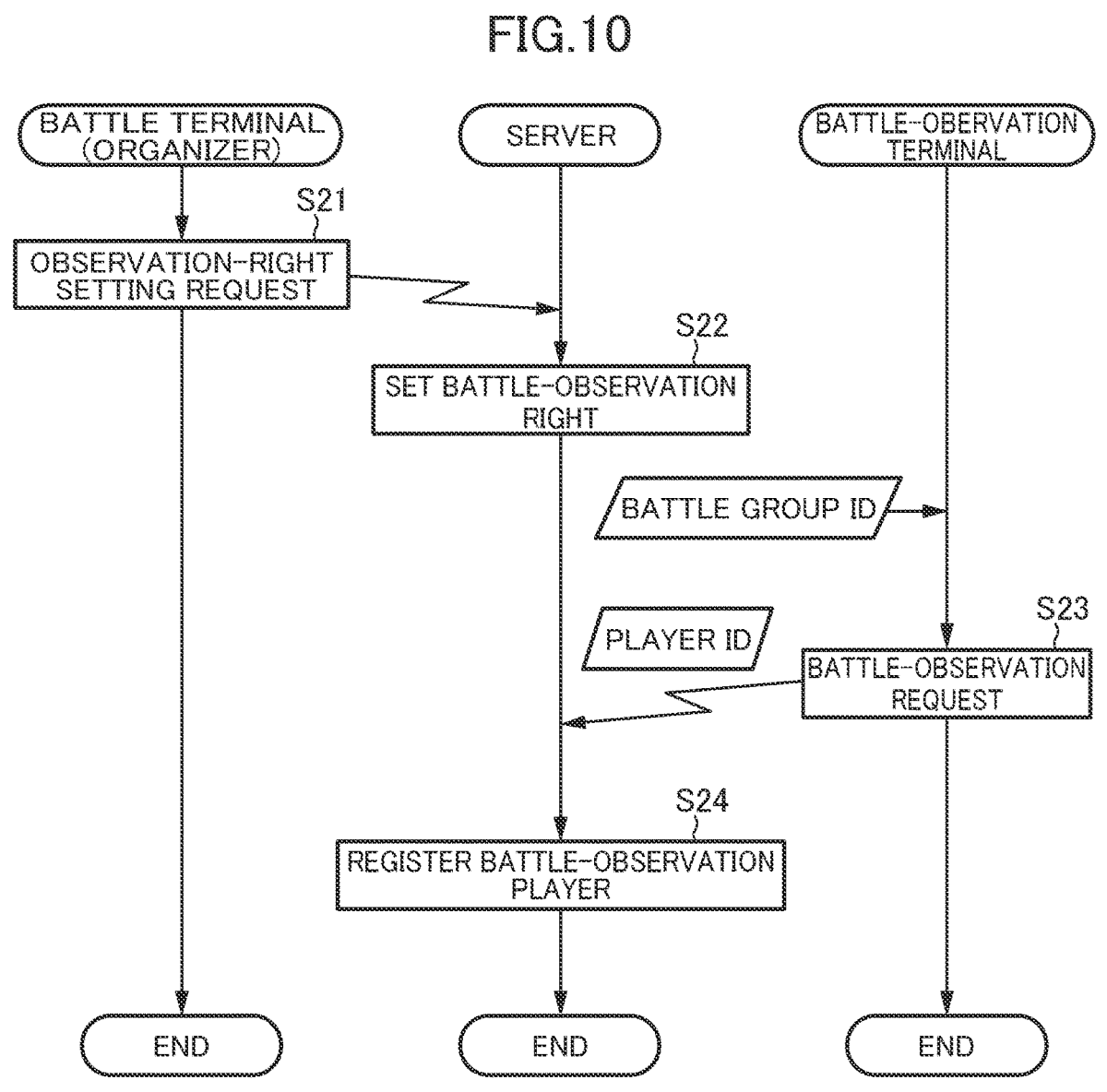

```
BATTLE TERMINAL          SERVER          BATTLE-OBSERVATION
  (ORGANIZER)                                 TERMINAL
```

S21
OBSERVATION-RIGHT
SETTING REQUEST

S22
SET BATTLE-OBSERVATION
RIGHT

BATTLE GROUP ID

PLAYER ID

S23
BATTLE-OBSERVATION
REQUEST

S24
REGISTER BATTLE-OBSERVATION
PLAYER

END          END          END

PROGRAM, INFORMATION PROCESSING DEVICE, METHOD, AND SYSTEM

TECHNICAL FIELD

The present invention relates to a program etc. and, in particular, relates to a program etc. for a game for executing a plurality of items of game content.

BACKGROUND ART

In the related art, there is a known program for executing a game that has implemented a battle function for allowing players to perform a battle organized by one or both of the players by using terminals connected by a communication line. It is known that some of such existing battle functions have implemented a battle-observation function for allowing the state of the battle between the players to be observed through a screen of a terminal.

CITATION LIST

Patent Literature

[Patent Literature 1] Publication of Japanese Patent No. 6783918

SUMMARY OF INVENTION

Technical Problem

Games include, in addition to a battle game that implements a battle function and a battle-observation function, a story game in which a player enjoys story development, in some cases. In such a game that includes both a battle game and a story game, when a common background is set for a background, such as a game field, used in the story game and a background used in the battle game, and the battle is observed with the battle-observation function, if the background used in the story game is used in the battle as is, this background is disclosed to a battle-observation player that has not yet cleared the story game, whereby a so-called spoiler may occur, and a problem may occur in that the fun of the game is lost. Such a problem is caused not only due to the background but also the whole production commonly used in the story game and the battle game.

The present invention has been made to solve the above-described problem, and an object thereof is to provide a program, an information processing device, a method, and a system capable of preventing the disclosure of a production corresponding to a progress level that a battle-observation player has not yet achieved in a story game, to the battle-observation player when the battle-observation player observes a battle between battle players.

Solution to Problem

According to one aspect, the present invention provides a program for a game to be executed by an information processing device, the game including a story game and a battle game, battle presentation information with respect to terminal devices of battle players of a battle in the battle game being calculated by using production information for the story game, and the battle observable at a terminal device of a battle-observation player, the program being characterized by causing the information processing device to function as a battle-observation-presentation-information calculation means that calculates battle-observation presentation information with respect to the terminal device of the battle-observation player of the battle on the basis of production information based on a progress level of the battle-observation player in the story game and input information related to the battle.

According to one aspect, the present invention provides an information processing device for a game, the game including a story game and a battle game, battle presentation information with respect to terminal devices of battle players of a battle in the battle game being calculated by using production information for the story game, and the battle being observable at a terminal device of a battle-observation player, the information processing device being characterized by including a battle-observation-presentation-information calculation means that calculates battle-observation presentation information with respect to the terminal device of the battle-observation player of the battle on the basis of production information based on a progress level of the battle-observation player in the story game and input information related to the battle.

According to one aspect, the present invention provides a method for a game, the game including a story game and a battle game, battle presentation information with respect to terminal devices of battle players of a battle in the battle game being calculated by using production information for the story game, and the battle being observable at a terminal device of a battle-observation player, the method being characterized by including a battle-observation-presentation-information calculation step for calculating battle-observation presentation information with respect to the terminal device of the battle-observation player of the battle on the basis of production information based on a progress level of the battle-observation player in the story game and input information related to the battle.

According to one aspect, the present invention provides a system for a game, the system having a plurality of information processing devices, the game including a story game and a battle game, battle presentation information with respect to terminal devices of battle players of a battle in the battle game being calculated by using production information for the story game, and the battle being observable at a terminal device of a battle-observation player, at least one of the information processing devices being characterized by including a battle-observation-presentation-information calculation means that calculates battle-observation presentation information with respect to the terminal device of the battle-observation player of the battle on the basis of production information based on a progress level of the battle-observation player in the story game and input information related to the battle.

Advantageous Effects of Invention

According to the present invention, it is possible to prevent disclosure of production corresponding to a progress level that a battle-observation player has not yet achieved in a story game, to the battle-observation player when the battle-observation player observes a battle between battle players.

BRIEF DESCRIPTION OF DRAWINGS

FIG. 4 is a view showing one example of a stage/progress-level correspondence table in which stages and progress levels in a story game are associated.

FIG. 5 is a view showing one example of a progress-level/production-information correspondence table in which the progress levels and items of production information in the story game are associated.

FIG. 6 is a functional block diagram of a game control unit of a server.

FIG. 8 shows one example of an operation flowchart of the game system according to the embodiment of the present invention.

FIG. 9 shows one example of an operation flowchart of a battle-player registration step in the game system according to the embodiment of the present invention.

FIG. 10 shows one example of an operation flowchart of a battle-observation-player registration step in the game system according to the embodiment of the present invention.

DESCRIPTION OF EMBODIMENTS

A game system according to an embodiment of the present invention will be described below with reference to the accompanying drawings. In this specification, for convenience of description, there are cases where descriptions that are more detailed than necessary are omitted. For example, there are cases where detailed descriptions of matters that are already well known and repeated descriptions of substantially the same configurations are omitted.

Although this game system can be realized by a system in which a plurality of information processing devices are connected via a network, this game system can also be realized by one information processing device. First, a description will be given of an embodiment that is realized by a system connected to the network, and then, one information processing device will be described.

Embodiment Realized by System

[Schematic Configuration]

Figure 1:
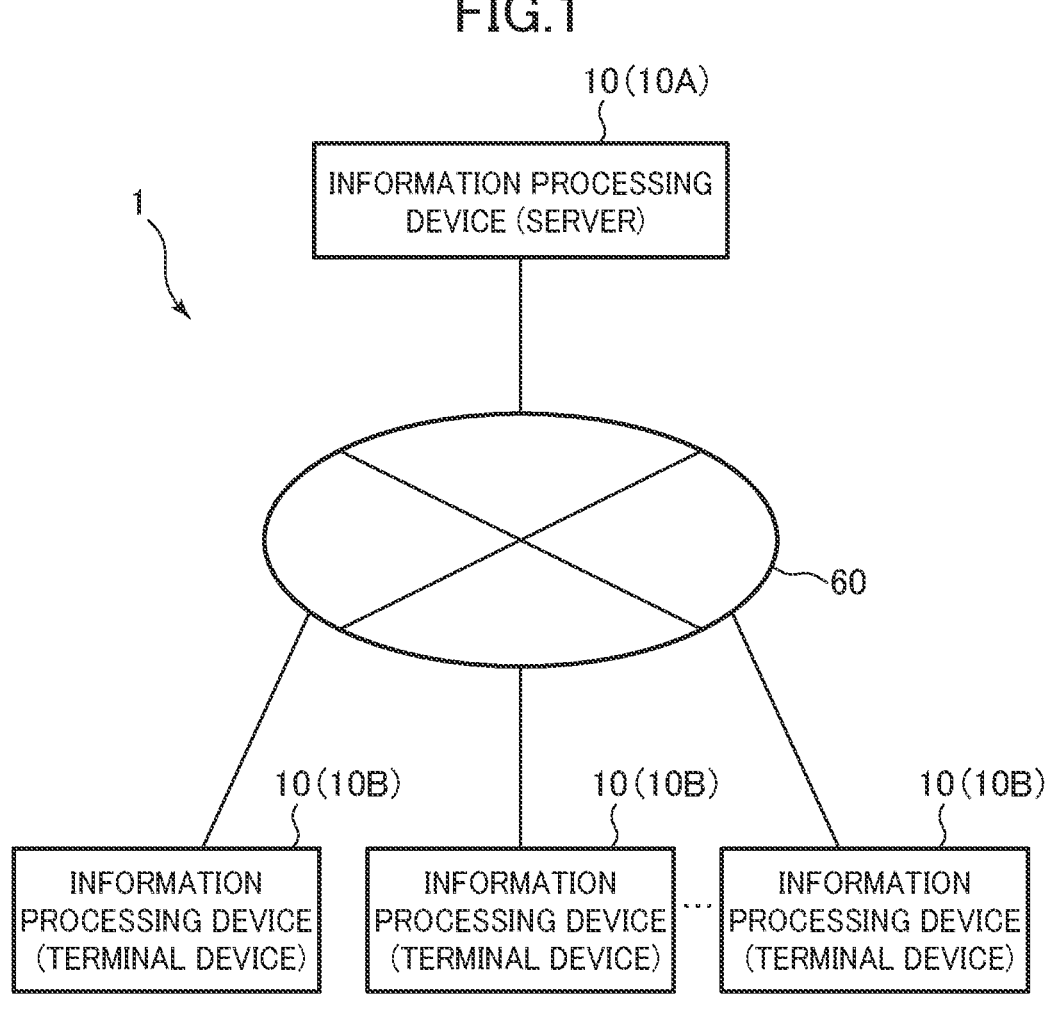
FIG. 1 is a view showing one example of the overall configuration of a game system according to one embodiment of the present invention.

FIG. 1 is a view showing one example of the overall configuration of a game system 1 according to one embodiment of the present invention. As shown in FIG. 1, the game system 1 includes a plurality of information processing devices 10. The information processing devices 10 include a server and terminal devices used by individual players. That is, on the assumption that any of the information processing devices 10 is referred to as a server 10A when the information processing device 10 serves as a server, and some of the information processing devices 10 are referred to as terminal devices 10B when the information processing devices 10 serve as terminal devices, the information processing device 10 is the server 10A according to one aspect and is the terminal device 10B according to another aspect. The server 10A and the terminal devices 10B can each include the hardware configuration of the information processing device 10 and are connected to a network 60, such as the Internet, so as to be able to communicate with each other. Note that, although a description will be given on the assumption that the game system 1 of this embodiment is a server-client system, the game system 1 can be configured of a system that does not include the server 10A, as in PtoP.

The server 10A can be configured of one or a plurality of computers each providing a game that is reproducible at the terminal devices 10B. In this embodiment, the terminal devices 10B are each a consumer-oriented game machine. Alternatively, the terminal devices 10B may each be a computer, such as a smartphone, a tablet computer, a laptop personal computer, or a desktop computer, as long as the computer includes the hardware configuration of the information processing device 10.

The server 10A stores various programs, such as a control program for controlling the proceedings of an online game, and various kinds of data to be used in the game. The server 10A sends data to and receives data from each of the terminal devices 10B regularly or as needed, to proceed with the game.

In one example, a game application program that is executable at the terminal devices 10B is stored in advance in the terminal devices 10B, and the terminal devices 10B accept operations related to the game and send information related to the operations to the server 10A. The server 10A executes the game, sends the execution result and information required to be displayed at the terminal devices 10B to the terminal devices 10B, and causes output devices of the terminal devices 10B to display information related to the game on screens thereof. Note that, although each of the terminal devices 10B of this embodiment is a consumer-oriented game machine, in the case where the terminal device 10B is a smartphone, the game application program can be obtained by being downloaded from the server 10A.

[Detailed Configuration]

Figures 2, 3:
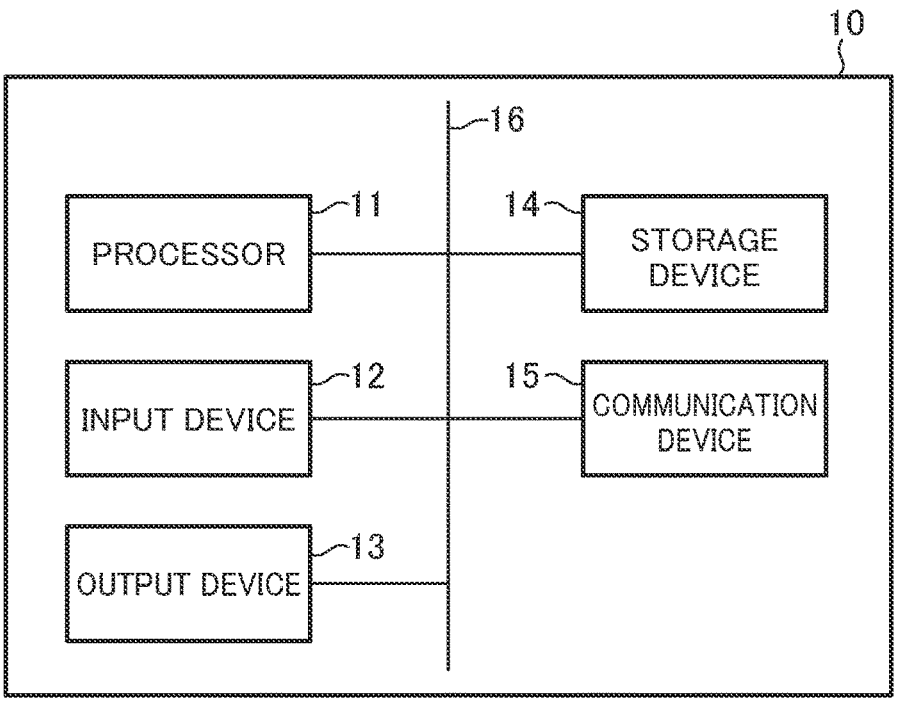
FIG. 2 is a block diagram showing the hardware configuration of an information processing device according to the embodiment of the present invention.
FIG. 3 shows one example of a functional block diagram of the information processing device according to the embodiment of the present invention.

FIG. 2 is a block diagram showing the hardware configuration of the information processing device 10. As shown in FIG. 2, the information processing device 10 includes a processor 11, an input device 12, an output device 13, a storage device 14, and a communication device 15. These individual constituent devices 11 to 15 are connected via a bus 16. Note that interfaces may be interposed as needed between the bus 16 and the individual constituent devices 11 to 15.

The processor 11 controls the overall operation of the information processing device 10 and is, for example, an electronic circuit such as a CPU or an MPU. The processor 11 executes various kinds of processing by loading programs and data stored in the storage device 14 and executing the programs. In one example, the processor 11 is constituted of a plurality of processors.

The input device 12 is a user interface for accepting inputs to the information processing device 10 from the user; for example, the input device 12 is a touch panel, a touchpad, a keyboard, or a mouse. In the case where the information processing device 10 includes a touch panel, this touch panel can be a touchscreen, for example, and also functions as the input device 12 and the output device 13. The input device 12 and the output device 13 may have separate forms disposed at different positions.

The output device 13 presents application screens etc. to a user of the information processing device 10, that is, a player, under the control of the processor 11. The output device 13 can include a display, such as a liquid crystal display, an organic EL display, or a plasma display, and a speaker that emits a sound.

The storage device 14 is a storage device that includes a main memory, a buffer memory, and storage and that is included in a general smartphone or computer, such as a magnetic storage device and a storage device that uses RAM, which is a volatile memory, and a flash memory, which is a non-volatile memory, such as an eMMC, a UFS, or an SSD. The storage device 14 may include an external memory. The storage device 14 stores, for example, a game application. The game application includes a game program for executing a game and various kinds of data to be referred to when the game program is executed. The game program is activated in accordance with an operation of the user with respect to the information processing device 10, and is executed on an operating system (OS) implemented in advance in the information processing device 10.

In one example, the storage device 14 includes a main storage device and an auxiliary storage device. The main storage device is a volatile storage medium that allows high-speed reading and writing of information, and is used as a storage area and a work area when the processor 11 processes information. The auxiliary storage device stores various programs and data that is used by the programs when the programs are executed. Although the auxiliary storage device is, for example, an SSD or a hard disk device, the auxiliary storage device may be any type of non-volatile storage or non-volatile memory that is capable of storing information and may be detachable. The auxiliary storage device stores, for example, an operating system (OS), middleware, application programs, and various kinds of data that may be referred to when these programs are executed.

The communication device 15 sends data to and receives data from other computers, such as a server, via the network 60. For example, the communication device 15 performs wireless communication, such as mobile communication or wireless LAN communication, to connect to the network 60. In one example, the information processing device 10 downloads a program from the server by means of the communication device 15 and stores the program in the storage device 14. Alternatively, the communication device 15 may perform wired communication using an Ethernet (registered trademark) cable or the like. In the case where data is not sent to or received from another computer, the information processing device 10 need not include the communication device 15.

FIG. 3 is an example of a functional block diagram of the information processing device 10. The information processing device 10 includes an input unit 21, an output unit 22, a storage unit 23, a communication unit 24, and a game control unit 25. In this embodiment, these functions are realized when the processor 11 executes a program. For example, the program to be executed is the game program stored in the storage device 14 or received via the communication device 15. Since the various kinds of functions are realized by loading the program, as described above, a portion or the entirety of one part (function) may be included in another part. The various kinds of functions are realized as individual means through execution of the program. Alternatively, these functions may be realized by means of hardware by configuring electronic circuits or the like each realizing a portion or the entirety of each of the functions.

The input unit 21 is configured by using the input device 12 and accepts inputs to the information processing device 10 from the user. The output unit 22 is configured by using the output device 13 and presents information related to the game to the user of the information processing device 10. The storage unit 23 is configured by using the storage device 14 and stores various kinds of information related to the game and programs. The communication unit 24 is configured by using the communication device 15 and functions as an interface for sending and receiving information to and from the other information processing device(s) 10. The communication unit 24 sends input information input from the user and accepted by the input unit 21, to the other information processing device(s) 10 via the network 60. Furthermore, the communication unit 24 receives information from the other information processing device(s) 10 and passes the information to the individual units.

The game control unit 25 performs basic control when the game of this embodiment is executed. The game control unit 25 is configured to include the processor 11, executes a game, and causes the display device 13 to display a screen related to the game. Execution of the game by the game control unit 25 can include: acquisition of information necessary for the execution from the storage device 14; acquisition of player operation information via the input device 12, the communication device 15, and/or the network 60; execution of information processing for the game on the basis of the necessary information; and generation and/or acquisition of information necessary for display of screens made to be displayed on the display device 13, on the basis of the information processing.

Next, the game of this embodiment and the game control unit 25 will be sequentially described in detail. The game control unit 25 of the server 10A is referred to as a game control unit 25A, and the game control unit 25 of the terminal device 10B is referred to as a game control unit 25B.

[Game]

The game of this embodiment includes a story game and a battle game. The story game is a game that proceeds along a predetermined story in accordance with player operation information. In one example, the story game is a role playing game (RPG). The story game includes a plurality of stages, and, when a stage is cleared, it is possible to advance to the next stage. That is, the story game has progress levels linked with the individual stages. In the example shown in FIG. 4, a stage ID, a stage name, and a progress level are associated with each stage, in the form of a stage/progress-level correspondence table. The progress level can be expressed by a numerical value, and it is possible that the numerical value corresponds to the difficulty level such that the difficulty level of a stage is increased as the numerical value becomes higher. This table is stored in advance in the storage device 14 of the information processing device 10. Furthermore, the progress level of each player in the story game can be stored in the storage device 14 of the terminal device 10B of this player.

In each stage, the game is executed by using production information associated with the corresponding progress level. The production information is information necessary to display a game screen that the game control unit 25 causes the output device 13 to display thereon, and can include, for example, background information, BGM information, video effect information, and sound effect information that are used in the stage. The background information is image data of a game field serving as the background of the game. The BGM information is BGM data to be played in the stage. The video effect information is, for example, visual production data for a skill associated with a game medium, such as a character, a card, etc., of the player, the visual production data being used at the time of exercising the skill. The sound effect information is, for example, auditory production data for a skill associated with a game medium, such as a character, a card, etc., of the player, the auditory production data being used at the time of exercising the skill.

In the example shown in FIG. 5, a stage ID, a progress level, a production information ID, and production information are associated with each other in the form of a progress-level/production-information correspondence table, and the table and the production information are stored in the storage device 14 of each of the terminal devices 10B in this embodiment. Various kinds of information included in the production information are associated with IDs that identify the various kinds of information, together with the production information ID. For example, production information that is associated with a certain production information ID includes background information, BGM information, video effect information, and sound effect information, which are individually associated with the certain production information ID, a background information ID, a BGM information ID, a video effect information ID, and a sound effect information ID.

The battle game is a game in which battle players battle with each other. Specifically, the battle game is executed by the server 10A on the basis of items of battle-related input information input by the battle players to the terminal devices 10B of the battle players. This battle game can be observed by a battle-observation player who is a player other than the battle players, by using terminal information 10B of the battle-observation player. The battle game can be, for example, a card battle game, a fighting game, or a sport battle game. The battle game can be a one-on-one battle, a one-on-N battle (N is a natural number of 2 or greater), or an N-on-N battle. The battle game of this embodiment is a one-on-one card battle game.

(Game Control Unit of Server)

FIG. 6 is a functional block diagram of the game control unit 25A of the server 10A. The game control unit 25A has a battle-group creating unit 31, a battle-player registering unit 32, a battle-observation-player registering unit 33, a battle-production deciding unit 34, and a battle control unit 35.

The battle-group creating unit 31 creates a battle group in which a plurality of players can participate, in response to a request from the terminal device 10B of a player who serves as an organizer of a battle in the battle game. In one example, the battle-group creating unit 31 associates the created battle group, a battle group ID, a battle name, a player ID of the organizer, and player information thereof with one another and causes these kinds of data to be stored in the storage device 14 of the server 10A. The battle-group creating unit 31 may send the battle group ID to the terminal device 10B of the organizer. Furthermore, the battle-group creating unit 31 may set a battle-participation right(s) and/or a battle-observation right(s) for the battle group, in response to a request from the organizer. In this case, the battle-group creating unit 31 may set battle-participation rights and/or a battle-observation right(s) for a predetermined number of arbitrary players or may set battle-participation rights and/or a battle-observation right(s) for players who have obtained the battle group ID.

In response to a registration request from the terminal device 10B of a player interested in participating in the battle, the battle-player registering unit 32 registers this player as a battle player in the battle group. Specifically, the battle-player registering unit 32 receives the battle group ID of the battle group in which the player is interested in participating, the player ID of the player interested in participating in the battle, and player information thereof that are sent from the terminal device 10B of the player interested in participating in the battle, and stores these kinds of data in the storage device 14 in association with the battle group ID.

In response to a registration request from the terminal device 10B of a player interested in observing the battle, the battle-observation-player registering unit 33 registers this player as a battle-observation player in the battle group. Specifically, the battle-observation-player registering unit 33 receives the battle group ID of the battle group to be observed, the player ID of the player interested in battle observation, and player information thereof that are sent from the terminal device 10B of the player interested in battle observation, and stores these kinds of data in the storage device 14 in association with the battle group ID. In one example, the battle-observation-player registering unit 33 compares the player ID of the player interested in battle observation, the player ID being included in the battle-observation registration request, with a player ID for which the battle-observation right has been set, stores, in the case where both match, individual items of information and the battle group ID in the storage device 14 in association with each other, and sends a notification indicating that battle observation is allowed to the terminal device 10B of the player interested in battle observation, via the communication device 15.

Note that a player interested in participating in a battle or observing the battle may obtain the battle group ID directly from the organizer or may obtain the battle group ID through a means such as an Internet bulletin board or SNS.

The battle-production deciding unit 34 decides production information to be used in a battle of the battle game. In one example, the battle-production deciding unit 34 decides production information to be used in a battle on the basis of designation by any of the battle players. Examples of designation by a battle player can include designation of production information by the organizer serving as a battle player and designation thereof by one battle player selected by lottery or the like. In another example, the battle-production deciding unit 34 decides production information to be used in a battle on the basis of the progress level of a battle player in the story game. For example, the battle-production deciding unit 34 decides one item of production information from among items of production information each of which corresponds to the lowest progress level of any of the battle players, or a lower progress level. In one example, the battle-production deciding unit 34 determines whether the progress level corresponding to the production information ID designated by the organizer is equal to or lower than the progress level of each of the battle players. In the case where this progress level is equal to or lower than the progress level of each of the battle players, the battle-production deciding unit 34 decides the production information corresponding to this production information ID, as production information to be used in the battle. On the other hand, in the case where the progress level corresponding to the production information ID designated by the organizer exceeds the progress level of each of the battle players, the battle-production deciding unit 34 decides, by lottery, one item of production information from among items of production information each of which corresponds to the lowest progress level of any of the battle players, or a lower progress level, and decides this production information as production information to be used in the battle. Note that the progress level of each battle player in the story game can be included in player information sent from the terminal device 10B of the battle player at the time of making a battle registration request. That is, in this case, the storage device 14 of the server 10A stores the progress levels, in the story game, of all the battle players registered in the battle group.

Furthermore, the battle-production deciding unit 34 of this embodiment sends the ID of the decided production information (hereinafter, also referred to as production information ID) to the individual terminal devices 10B of the battle players via the communication device 15. Furthermore, the battle-production deciding unit 34 sends the decided production information ID to the terminal device 10B of each battle-observation player via the communication device 15.

The battle control unit 35 controls sending and receiving of battle-related input information input by each of the battle players. In one example, the battle control unit 35 causes the communication device 15 to send battle-related input information that is input by one of the battle players and that is received from the terminal device 10B of this battle player via the network 60, to the terminal device 10B of the other battle player, in chronological order. Accordingly, at the terminal device 10B of each of the battle players, battle-related input information that is input by the player of this terminal device 10B and battle-related input information that is input by the battle opponent player can be chronologically obtained and can be used to execute the battle game. In another example, it is also possible that the battle control unit 35 causes the terminal devices 10B of the individual battle players to send, thereto, battle-related input information that is input by one of the battle players and battle-related input information that is input by the other battle player, via the communication devices 15 in chronological order, and causes the communication device 15 to sequentially send the received items of input information to the terminal devices 10B of the battle players. With this configuration, it is also possible that the terminal devices 10B of the battle players obtain, from the individual battle players, items of input information necessary to execute the battle game. Furthermore, it is also possible that the battle control unit 35 chronologically associates items of input information, stores the items of input information as battle logs in the storage device 14, and/or sends the battle logs to the terminal devices 10B by means of the communication device 15.

Battle-related input information includes: the input time of a battle-related operation input via the input device 12 of the terminal device 10B of each of the battle players; and the content of the operation. In the case where the battle game is a card battle game as in this embodiment, the content of an operation is, for example, selection of a card in hand, exercise of a skill linked with a card in hand, or the like. Note that production information is not included in a battle log of this embodiment.

(Game Control Unit of Terminal Device)

Figure 7:
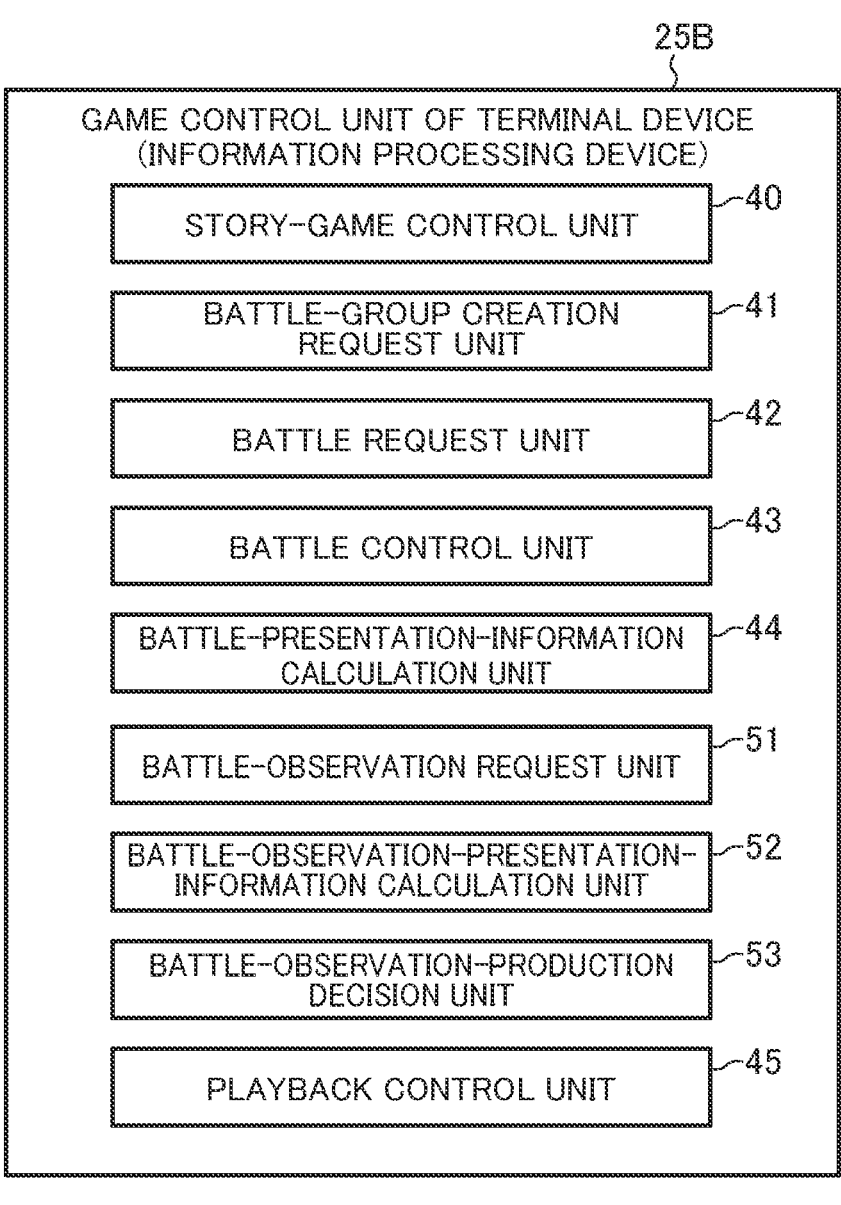
FIG. 7 is a functional block diagram of a game control unit in a terminal device.

FIG. 7 is a functional block diagram of the game control unit 25B in each of the terminal devices 10B. For convenience of explanation, there are cases in which the terminal device 10B of each battle player is referred to as a battle terminal 10B, and the terminal device 10B of each battle-observation player is referred to as a battle-observation terminal 10B.

As shown in FIG. 7, the game control unit 25B has a story-game control unit 40, a battle-group creation request unit 41, a battle request unit 42, a battle control unit 43, a battle-presentation-information calculation unit 44, a battle-observation request unit 51, a battle-observation-presentation-information calculation unit 52, a battle-observationproduction decision unit 53, and a playback control unit 45. Here, although the battle terminal 10B and the battle-observation terminal 10B have the common functional block, it is also possible that the battle-observation terminal 10B does not have the battle-group creation request unit 41, the battle request unit 42, the battle control unit 43, and the battle-presentation-information calculation unit 44, which function in the battle terminal 10B, and that the battle terminal 10B does not have the battle-observation request unit 51, the battle-observation-presentation-information calculation unit 52, and the battle-observation-production decision unit 53, which function in the battle-observation terminal 10B. The battle terminal 10B and the battle-observation terminal 10B have the common functional block, whereby a player who was a battle player can be a battle-observation player, and a player who was a battle-observation player can be a battle player.

The story-game control unit 40 executes a story-game program on the basis of an operation input from a player who is a battle player or a battle-observation player. In the case where a story game is saved in response to a request from the player, the story-game control unit 40 accepts the player's request via the input device 12 and stores, in the storage device 14, the progress level corresponding to the stage that has been cleared last at that point. Accordingly, when the story game is executed next, the story game can be restarted from the stage corresponding to the stored progress level. Furthermore, this stored progress level is sent to the server 10A via the communication device 15 at the time of making a battle participation request.

The battle-group creation request unit 41 accepts a battle-group creation request from a battle organizer via the input device 12 and causes the communication device 15 to send the battle-group creation request to the server 10A.

The battle request unit 42 causes the communication device 15 to send a registration request, accepted via the input device 12, from the player who is interested in participating in a battle in a predetermined battle group. The battle control unit 43 causes the communication device 15 to send battle-related input information accepted via the input device 12.

The battle-presentation-information calculation unit 44 executes a battle-game program on the basis of items of battle-related input information input from the individual battle players and the production information ID of production information used in the battle, the production information ID being sent from the server 10A, and calculates battle presentation information with respect to the battle terminal 10B. Specifically, first, the battle-presentation-information calculation unit 44 reads, from the storage device 14 of the battle terminal 10B, production information that corresponds to the production information ID and that has been decided by the battle-production deciding unit 34. The battle-presentation-information calculation unit 44 executes the battle-game program sequentially, for each turn, on the basis of this production information, items of input information in chronological order, and information related to game media of the individual battle players, and calculates battle presentation information. The battle presentation information is information used to presentation the state of the battle to the battle player by means of the output device 13 of the battle terminal 10B. The battle presentation information is, for example, moving-image data indicating the state of the battle. For example, this moving-image data includes: battle-related information, such as parameters (for example, attacking powers, defensing powers, physical strength, etc.) associated with game media such as characters or cards of the battle players; a field image that is background information serving as a battle field (game field); motions of the game media such as characters or cards of the battle players; visual and auditory production data for skills associated with these game media; and timing of presentation of a BGM, a video effect, and a sound effect included in the production information. These items of data are displayed on and output to the output device 13 of the battle terminal 10B (for example, a display device such as a display, and an audio device such as a speaker). Furthermore, the battle presentation information may separately include image data and audio data that indicate the state of the battle or may be image data or audio data that indicates the state of the battle. The battle-presentation-information calculation unit 44 changes the information (for example, the parameters) related to the game media, such as characters or cards associated with player IDs of the battle players, through execution of the battle-game program. For example, in one turn, on the basis of input information from one of the battle players, the battle-presentation-information calculation unit 44 reduces a physical parameter of a game medium of the other battle player.

The battle-observation request unit 51 causes the communication device 15 to send a registration request of the player interested in observing a battle in a predetermined battle group, the request being accepted via the input device 12.

The battle-observation-presentation-information calculation unit 52 calculates battle-observation presentation information with respect to the battle-observation terminal 10B on the basis of: items of battle-related input information input from the individual battle players; and production information based on the progress level of the battle-observation player in the story game. This calculation can be executed by a program common to the battle-game program executed by the battle-presentation-information calculation unit 44. That is, the battle-observation-presentation-information calculation unit 52 differs from the battle-presentation-information calculation unit 44 in that production information to be input is production information based on the progress level of the battle-observation player in the story game. The battle-observation presentation information is information used to present the state of the battle to the battle-observation player by means of the output device 13 of the battle-observation terminal 10B, and is basically common to the battle presentation information and is different therefrom in terms of at least production information. For example, it is possible that the battle field to be presented to the battle players is background information corresponding to a progress level 5, whereas the battle field to be presented to the battle-observation player is background information corresponding to a progress level 3.

The battle-observation-production decision unit 53 decides production information based on the progress level of the battle-observation player in the story game. This decided production information is used as production information based on the progress level of the battle-observation player in the story game, in the battle-observation-presentation-information calculation unit 52.

In this embodiment, the battle-observation-production decision unit 53 decides production information that is based on the progress level of the battle-observation player in the story game and that is to be used in the battle-observation-presentation-information calculation unit 52, on the basis of the result of comparison between the progress level of the battle-observation player and the progress level, in the story game, associated with the production information for the battle between the battle players.

Specifically, in the case where the progress level of the battle-observation player is equal to or higher than the progress level, in the story game, associated with the production information for the battle between the battle players, the battle-observation-production decision unit 53 decides the production information for the battle between the battle players, as production information based on the progress level of the battle-observation player. On the other hand, in the case where the progress level of the battle-observation player is lower than the progress level, in the story game, associated with the production information for the battle between the battle players, the battle-observation-production decision unit 53 decides any one of a plurality of items of production information for the story game, each of which corresponds to the progress level of the battle-observation player or lower, as production information based on the progress level of the battle-observation player. Here, the production information for the battle between the battle players is production information used in the battle and decided by the battle-production deciding unit 34 of the server 10A. The battle-observation-production decision unit 53 obtains the production information ID of this production information from the server 10A, refers to the stage/progress-level correspondence table and the progress-level/production-information correspondence table, which are stored in the storage device 14 of the battle-observation terminal 10B, and identifies the progress level corresponding to the production information ID. Accordingly, the battle-observation-production decision unit 53 can obtain the progress level corresponding to the production information used in the battle. Furthermore, the battle-observation-production decision unit 53 can obtain the progress level of the battle-observation player in the story game by reading the same from the storage device 14 of the battle-observation terminal 10B.

The battle-observation-production decision unit 53 can decide production information based on the progress level of the battle-observation player in the story game, on the basis of selection by the battle-observation player or a lottery process, from among a plurality of items of production information for the story game, each of which corresponds to the progress level of the battle-observation player or lower. In one example, after identifying the progress level corresponding to the production information used in the battle, the battle-observation-production decision unit 53 refers to the progress-level/production-information correspondence table to identify items of production information each of which corresponds to this progress level or lower. Then, from among the range of the identified items of production information, one item of production information is decided, by a lottery process, as production information based on the progress level of the battle-observation player in the story game. In another example, the battle-observation-production decision unit 53 causes the output device 13 (for example, a display device) to display items of production information each of which corresponds to the identified progress level or lower, accepts a battle-observation player's selection of one item of production information therefrom via the input device 12, and decides the selected production information as production information based on the progress level of the battle-observation player in the story game.

The playback control unit 45 presents the state of the battle to the output device 13 on the basis of presentation information and causes the output device 13 to perform playback of the presentation information. In the case where the terminal device 10B is a battle terminal 10B, the playback control unit 45 presents battle presentation information to the battle player, and, in the case where the terminal device 10B is a battle-observation terminal 10B, the playback control unit 45 presents battle-observation presentation information to the battle-observation player. Specifically, the output device 13 includes a display device such as a display and an audio device such as a speaker, and the playback control unit 45 controls the output device 13 on the basis of the battle presentation information or the battle-observation presentation information, and causes the output device 13 to play back the moving image of the battle.

[Operation]

The operation of the game system 1 according to the embodiment of the present invention will be described below. FIG. 8 shows one example of an operation flowchart of the game system 1 according to the embodiment of the present invention. The operation of the game system 1 includes: a registration step S1 for registering battle players and a battle-observation player(s) in a battle group; and an execution step S2 for battle and battle observation in this battle group.

(Registration Step)

The registration step S1 includes a battle-player registration step and a battle-observation-player registration step. The battle-player registration step is a step for registering battle players in a battle group. The battle-observation-player registration step is a step for registering a battle-observation player(s) in the battle group.

FIG. 9 shows one example of an operation flowchart of the battle-player registration step in the game system 1 according to the embodiment of the present invention. As shown in FIG. 9, in the battle-player registration step, first, from the battle terminal 10B of the organizer, the battle-group creation request unit 41 sends a battle-group creation request to the server 10A (S11). At this time, the battle-group creation request unit 41 sends a player ID of the organizer, player information thereof, and a battle name. At the server 10A, the battle-group creating unit 31 creates a battle group in response to reception of this battle-group creation request (S12). At this time, a battle group ID corresponding to the created battle group is issued by the battle-group creating unit 31 and is sent to the battle terminal 10B of the organizer. Furthermore, the battle-group creating unit 31 stores the created battle group, the battle group ID, the battle name, the player ID of the organizer, and the player information thereof in the storage device 14 of the server 10A in association with one another. Here, the organizer is stored in the storage device 14 as a battle applicant.

A battle participation applicant obtains the battle group ID directly from the organizer and sends a battle request indicating a desire to participate in the battle, to the server 10A from the terminal device 10B of the battle participation applicant by means of the battle request unit 42 (S13). At this time, the battle request unit 42 sends a player ID and player information of the battle participation applicant to the server 10A. At the server 10A, the battle-player registering unit 32 associates the player ID of the battle participation applicant associated with the received battle request, with the battle group ID, and stores this battle applicant as a battle player in the storage device 14 of the server 10A, thus registering the battle player (S14). After the registration, the server 10A may send a notification indicating that the battle player has been registered, to the terminal devices 10B of the organizer and the battle player.

FIG. 10 shows one example of an operation flowchart of the battle-observation-player registration step in the game system 1 according to the embodiment of the present invention.

As shown in FIG. 10, first, the battle terminal 10B of the organizer sends, to the server 10A, an organizer's request for battle-observation-right setting (S21). This request is sent by the battle-group creation request unit 41, for example. At the server 10A, when the battle-observation-right setting request is received, the battle-group creating unit 31 sets a battle-observation right (S22). For example, the organizer obtains, in advance, the player ID of a battle-observation applicant and sends the player ID to the server 10A together with the battle-observation-right setting request, to cause the storage device 14 of the server 10A to store the player ID in association with the battle group ID, thus setting the player corresponding to this player ID as a player who can observe the battle.

The battle-observation applicant obtains the battle group ID directly from the organizer and sends a battle-observation request indicating a desire to observe the battle, to the server 10A from the terminal device 10B of the battle-observation applicant by means of the battle-observation request unit 51 (S23). At this time, the battle-observation request unit 51 sends the player ID and the player information of the battle-observation applicant, to the server 10A. At the server 10A, the battle-observation-player registering unit 33 checks the player ID of the battle-observation applicant associated with the received battle-observation request, against the player ID that is stored in the storage device 14, that is associated with the battle group ID, and for which the right to be able to observe the battle is set, associates the player ID of the battle-observation applicant with the battle group ID in the case where those player IDs match, and stores this battle-observation applicant as a battle-observation player in the storage device 14 of the server 10A, thereby registering the battle-observation player (S24). After the registration, the server 10A may send a notification indicating that the battle-observation player has been registered, to the terminal devices 10B of the organizer, the battle player, and the battle-observation player. On the other hand, in the case where the player ID of the battle-observation applicant does not match with the player ID for which the right to be able to observe the battle is set, the battle-observation-player registering unit 33 determines that this battle-observation applicant does not have a battle-observation right, and sends a notification to that effect to the terminal device 10B of this applicant.

Note that, in the example shown in FIG. 10, although the organizer sets the battle-observation right, the battle-observation right is not necessarily set, and it is also possible that an arbitrary battle-observation applicant is allowed to participate in observing the battle.

(Execution Step)

The execution step S2 is a step for executing battle processing performed between the battle players and battle-observation processing performed by the battle-observation player.

Figure 11:
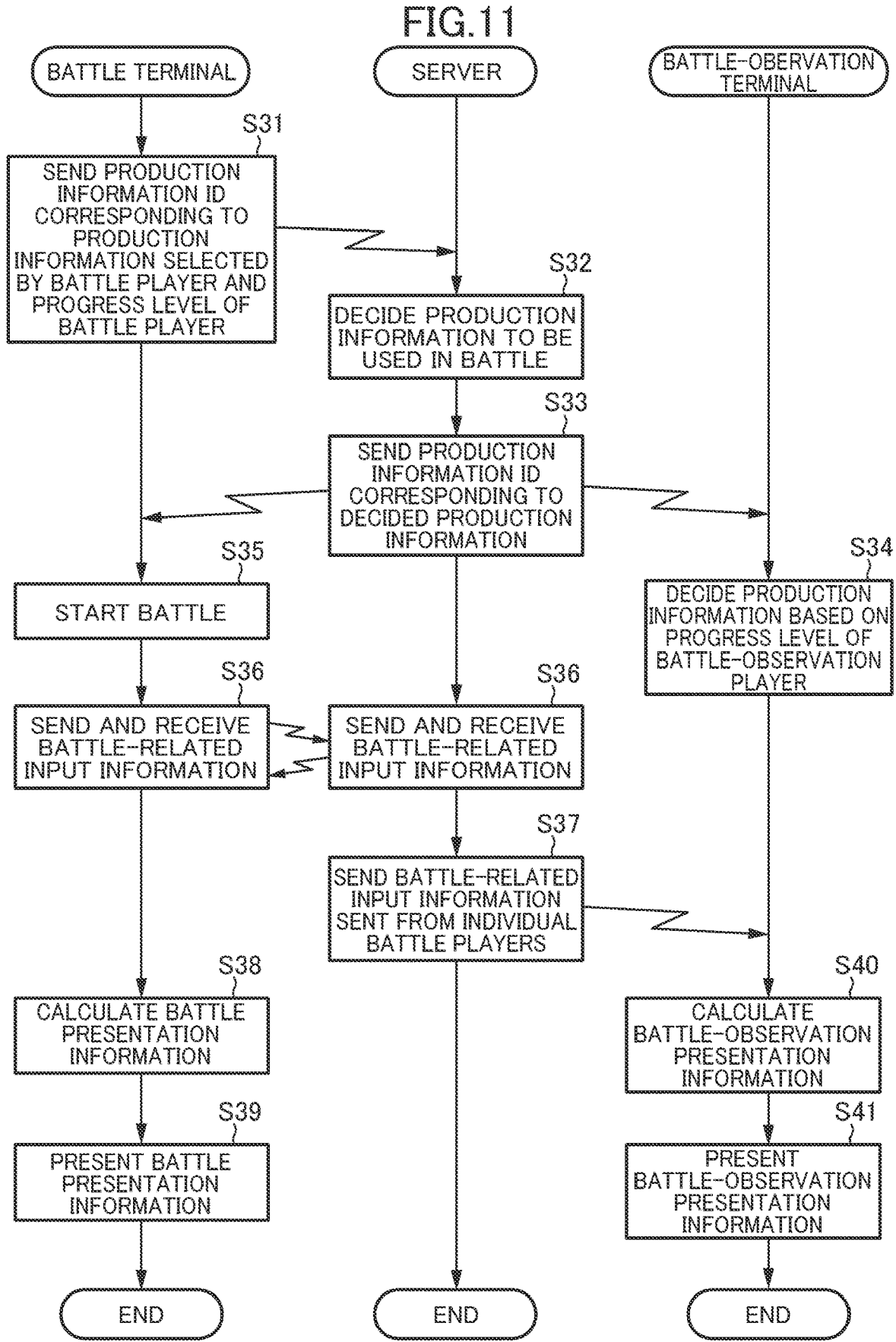
FIG. 11 shows one example of an operation flowchart of an execution step in the game system according to the embodiment of the present invention.

FIG. 11 shows one example of an operation flowchart of the execution step in the game system 1 according to the embodiment of the present invention. As shown in FIG. 11, the battle terminal 10B of each of the battle players accepts a selection of production information to be used in the battle from the corresponding battle player and sends the corresponding production information ID to the server 10A together with the progress level of this battle player in the story game (S31). At the server 10A, the battle-production deciding unit 34 decides production information to be used in the battle of the battle game (S32). Specifically, the battle-production deciding unit 34 compares the progress levels of the individual battle players in the story game and decides production information that is selected by the battle player having the lowest progress level, as production information to be used in the battle. The reason for this is that, in the battle terminal 10B, production information that can be selected by the battle player is limited to items of production information each of which corresponds to the progress level of this battle player or lower, the production information that is selected by the battle player having the lowest progress level is production information that can also be selected by the other battle player, and a situation (a so-called spoiler) in which production information that is unknown to a battle player(s) becomes known thereto outside the story game is prevented.

At the server 10A, the battle-production deciding unit 34 sends the production information ID corresponding to the decided production information to the battle terminals 10B of the individual battle players and the battle-observation terminal 10B (S33).

At the battle-observation terminal 10B, the battle-observation-production decision unit 53 decides production information based on the progress level of the battle-observation player (S34). Specifically, the battle-observation-production decision unit 53 identifies the progress level corresponding to the production information ID, from the decided production information ID used in the battle and the progress-level/production-information correspondence table, and compares the identified progress level with the progress level of the battle-observation player read from the storage device 14. In the case where the progress level of the battle-observation player is equal to or higher than the identified progress level, the battle-observation-production decision unit 53 decides the decided production information used in the battle, as production information based on the progress level of the battle-observation player. On the other hand, in the case where the progress level of the battle-observation player is lower than the identified progress level, the battle-observation-production decision unit 53 identifies items of production information each of which corresponds to the progress level of the battle-observation player or lower, by referring to the progress-level/production-information correspondence table, and decides, by a lottery process, one item of production information from among the identified items of production information, as production information based on the progress level of the battle-observation player. In this way, it is possible to perform preparation for the start of the battle and battle-observation.

Next, the battle is started in response to a battle start request from any of the battle players (S35). Specifically, a battle start request is sent from any of the terminal devices 10B to the server 10A, the server 10A decides which of the battle players plays first and sends the order of attack turns to the individual battle terminals 10B and the battle-observation terminal 10B, together with a battle start notification. Furthermore, the battle terminals 10B send, to the server 10A, information (for example, including parameters for attacking powers, defending powers, physical strength, etc.) related to the game media used in the battle by the battle players, and the server 10A sends, to each of the individual battle terminals 10B, information related to the game medium of the battle opponent player.

The individual battle terminals 10B exchange, with the server 10A, battle-related input information input by the battle players (S36). Each of the battle terminals 10B sequentially sends, to the server 10A, battle-related input information input by the battle player, and the server 10A sequentially sends the received input information to the other (battle opponent player's) battle terminal 10B, which is different from the battle terminal 10B that has sent this input information. Furthermore, the server 10A sequentially sends items of input information received from the individual battle terminals 10B, to the battle-observation terminal 10B (S37).

At each of the battle terminals 10B, battle-related input information that is input from the battle player of that battle terminal 10B and battle-related input information that is input from the battle opponent player are sequentially obtained, the battle-presentation-information calculation unit 44 of each of the battle terminals 10B executes the battle-game program on the basis of these items of input information and the production information decided by the battle-production deciding unit 34, and calculates battle presentation information with respect to the battle terminal 10B (S38). Specifically, at the individual battle terminals 10B, the same battle-game program is executed on the basis of the same items of input information, production information, and information related to the game media, whereby the common battle presentation information is calculated. However, in the battle presentation information, points of view in the field viewed from the individual battle players or the like may be different from each other. For example, cards in one's hand can be made invisible from the battle opponent player.

At each of the battle terminals 10B, the playback control unit 45 presents the calculated battle presentation information to the battle player by controlling the output device 13 (S39). That is, the playback control unit 45 plays back the battle in accordance with the calculated battle presentation information via the output device 13, to present the battle to the battle player.

On the other hand, at the battle-observation terminal 10B, items of input information from the individual battle players are sequentially obtained by being sent from the server 10A. The battle-observation-presentation-information calculation unit 52 of the battle-observation terminal 10B executes the battle-game program, which is common to that executed in the battle terminals 10B, on the basis of items of battle-related input information input by the battle players and the production information decided by the battle-observation-production decision unit 53, and calculates battle-observation presentation information with respect to the battle-observation terminal 10B (S40).

The playback control unit 45 of the battle-observation terminal 10B presents the calculated battle-observation presentation information to the battle-observation player by controlling the output device 13 (S41). That is, the playback control unit 45 plays back the battle in accordance with the calculated battle-observation presentation information via the output device 13, to presentation the battle to the battle-observation player. In this battle-observation presentation information, production information to be presented is different, from that in the battle presentation information, in the case where the progress level of the battle-observation player in the story game is lower than the progress level corresponding to the production information decided by the battle-production deciding unit 34. For example, background information corresponding to the progress level 3 is displayed on a display screen of the display device as a battle field presented to the battle-observation player, whereas background information corresponding to the progress level 5 is displayed on display screens of the display devices as a battle field presented to the battle players. Thus, it is possible to prevent a situation in which production information that is used in a stage that has not been cleared in the story game by the battle-observation player is known by the battle-observation player before the battle-observation player clears this stage.

The battle-presentation-information calculation unit 44 and the battle-observation-presentation-information calculation unit 52 decide which of the battle players won the battle on the basis of a predetermined condition. In one example, when a predetermined parameter of a game medium of any one of the battle players becomes a predetermined value (for example, when the physical parameter thereof becomes 0), the battle player of which the predetermined parameter of the game medium becomes the predetermined value is decided as a loser, the other battle player is decided as a winner, and the battle is ended. That is, the battle is ended at the individual battle terminals 10B and the battle-observation terminal 10B.

[Operation/Effect]

(1) The game system 1 of this embodiment is a system for a game, the system having a plurality of information processing devices 10, the game including a story game and a battle game, battle presentation information with respect to the terminal devices 10 of battle players of a battle in the battle game being calculated by using production information for the story game, and the battle being observable at the terminal device 10 of a battle-observation player, at least one of the information processing devices 10 being configured to include a battle-observation-presentation-information calculation unit 52 that calculates battle-observation presentation information with respect to the terminal device 10 of the battle-observation player of the battle on the basis of production information based on the progress level of the battle-observation player in the story game and input information related to the battle.

Accordingly, it is possible to prevent disclosure (a so-called spoiler) of production of a progress level that the battle-observation player has not yet achieved, to the battle-observation player when the battle-observation player observes the battle between the battle players. That is, in this embodiment, it is possible to observe a battle so as not to share production information used in the battle, whereas, in general, battle observation means that one battle between battle players is shared with a battle-observation player from a common or different point of view. Thus, the fun of the story game for the battle-observation player can be maintained.

(2) The information processing device 10 includes the battle-observation-production decision unit 53, which decides production information based on the progress level of the battle-observation player in the story game, and the battle-observation-production decision unit 53 is configured to decide production information based on the progress level of the battle-observation player in the story game on the basis of the result of comparison between the progress level of the battle-observation player and the progress level, in the story game, associated with production information for the battle between the battle players. Specifically, the battle-observation-production decision unit 53 of this embodiment is configured to decide the production information for the battle between the battle players, as the production information based on the progress level of the battle-observation player, in the case where the progress level of the battle-observation player is equal to or higher than the progress level, in the story game, associated with the production information for the battle between the battle players, and to decide any one of a plurality of items of production information for the story game, each of which corresponds to the progress level of the battle-observation player or lower, as the production information based on the progress level of the battle-observation player, in the case where the progress level of the battle-observation player is lower than the progress level, in the story game, associated with the production information for the battle between the battle players.

Accordingly, it is possible to prevent disclosure of production corresponding to a progress level that the battle-observation player has not yet achieved, to the battle-observation player when the battle-observation player observes the battle between the battle players. In particular, since the progress level of the battle-observation player is not compared with the progress levels of the battle players in the story game of the battle players but is compared with a production level of the production information used in the battle, it is possible to more reliably prevent disclosure of production corresponding to a progress level that the battle-observation player has not yet achieved. In a modification, the battle-observation-production decision unit 53 may decide production information for the battle between the battle players, as the production information based on the progress level of the battle-observation player, in the case where the progress level of the battle-observation player exceeds the progress level, in the story game, associated with the production information for the battle between the battle players, and may decide any one of a plurality of items of production information for the story game, each of which corresponds to the progress level of the battle-observation player or lower, as the production information based on the progress level of the battle-observation player, in the case where the progress level of the battle-observation player is equal to or lower than the progress level, in the story game, associated with the production information for the battle between the battle players. With this configuration, it is also possible to prevent disclosure of production corresponding to a progress level that the battle-observation player has not yet achieved, to the battle-observation player when the battle-observation player observes the battle between the battle players.

Furthermore, in a modification, the battle-observation-production decision unit 53 may decide any one of a plurality of items of production information for the story game, each of which corresponds to the progress level of the battle-observation player or lower, as the production information based on the progress level of the battle-observation player. Accordingly, it is possible to prevent disclosure of production corresponding to a progress level that the battle-observation player has not yet achieved, to the battle-observation player when the battle-observation player observes the battle between the battle players. In particular, since production information for a battle to be observed is decided on the basis of the progress level of the battle-observation player in the story game, regardless of the production information selected by the battle player(s), it is not necessary to compare the production level of the production information selected by the battle player(s) and the progress level of the battle-observation player, thus making it possible to simplify the processing. In other words, unlike the above-described embodiment, since the battle-observation-production decision unit 53 decides production information on the basis of the progress level of the battle-observation player in the story game, without comparing the production level of the production information selected by the battle player(s) and the progress level of the battle-observation player, it is possible to omit the comparison determination processing with respect to the production level of the production information selected by the battle player(s).

Embodiment Realized By Information Processing Device

In the above-described embodiment, although the battle-presentation-information calculation unit 44 and the battle-observation-presentation-information calculation unit 52 are included in each of the terminal devices 10B, these units may be included in the server 10A. That is, the server 10A may calculate battle presentation information and battle-observation presentation information, send the calculated battle presentation information to the battle terminals 10B, and send the calculated battle-observation presentation information to the battle-observation terminal 10B. Therefore, the information processing device 10, which includes the battle-observation-presentation-information calculation unit 52, can be the terminal device 10B (the battle-observation terminal 10B) or can be the server 10A. Furthermore, the terminal devices 10B may proceed with a game directly or via the network 60, without the server 10A. That is, the individual functional units 31 to 35 in the game control unit 25A of the server 10A may be included in the terminal device(s) 10B. For example, all the functional units 31 to 35 in the game control unit 25A of the server 10A may be included in the terminal device 10B of the organizer of a battle or may be decentralized to the battle terminals 10B and the battle-observation terminal 10B and included in these terminal devices 10B.

In another example, the server 10A is a web server and provides a game service to the terminal devices 10B. Each of the terminal devices 10B obtains HTML data for displaying a web page from the server 10A, and analyzes the obtained HTML data to display the web page. In this case, the server 10A, which communicates with each of the terminal devices 10B, has the entirety or a portion of the function of the game control unit 25. For example, the terminal devices 10B each accept a player operation via the input device 12, presentation battle presentation information calculated by the server 10A, by means of the output devices 13 of the battle terminals 10B, and presentation battle-observation presentation information calculated by the server 10A, by means of the output device 13 of the battle-observation terminal 10B.

Other Embodiments

In the above-described embodiment, although a battle is executed at the terminal devices 10 through communication of items of battle-related input information input by the battle players, it is also possible that the battle-presentation-information calculation unit 44 that is included in the server 10A calculates battle presentation information including production information to be used in the battle and sends this battle presentation information to the individual battle terminals 10B and the battle-observation terminal 10B. In this case, in each of the battle terminals 10B, the battle is played back by the playback control unit 45. It is possible that, in the battle-observation terminal 10B, the progress level corresponding to the production information included in the battle presentation information is identified at the battle-observation-production decision unit 53 and the battle-observation-presentation-information calculation unit 52, and, in the case where the progress level of the battle-observation player is lower than the identified progress level, the production information to be used in the battle is replaced with production information that corresponds to the progress level of the battle-observation player or lower. Battle presentation information obtained after this replacement is used as battle-observation presentation information to be played back by the playback control unit 45 of the battle-observation terminal 10B. Accordingly, it is possible to prevent disclosure of production corresponding to a progress level that the battle-observation player has not yet achieved.

In another embodiment of the present invention, it is also possible to provide a program that realizes the functions and the information processing shown in the flowcharts of the above-described embodiment of the present invention and a computer-readable storage medium that has stored the program. Furthermore, in still another embodiment, it is also possible to provide a method that realizes the functions and the information processing shown in the flowcharts of the above-described embodiment of the present invention. Furthermore, in still another embodiment, it is also possible to provide a server that can supply, to a computer, a program that realizes the functions and the information processing shown in the flowcharts of the above-described embodiment of the present invention. Furthermore, in still another embodiment, it is also possible to provide a virtual machine that realizes the functions and the information processing shown in the flowcharts of the above-described embodiment of the present invention.

The processing or operation described above can be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1 game system
10 information processing device
10A server
10B terminal device (battle terminal, battle-observation terminal)
11 processor
12 input device
13 output device
14 storage device
15 communication device
16 bus
21 input unit
22 output unit
23 storage unit
24 communication unit
25 game control unit
25A game control unit of server
25B game control unit of terminal device
31 battle-group creating unit
32 battle-player registering unit
33 battle-observation-player registering unit
34 battle-production deciding unit
35 battle control unit
40 story-game control unit
41 battle-group creation request unit
42 battle request unit
43 battle control unit 44 battle-presentation-information calculation unit
45 playback control unit
51 battle-observation request unit
52 battle-observation-presentation-information calculation unit
53 battle-observation-production decision unit
60 network

The invention claimed is:

1. A non-transitory computer readable medium storing a program for a game to be executed by an information processing device, the game including a story game and a battle game, and a battle of the battle game being observable at a terminal device of a battle-observation player, wherein the program, when executed by the information processing device, is configured to perform a method comprising:

determining first production information for the battle-observation player based on a first progress level of the battle-observation player in the story game, wherein determining the first production information is based on a result of a comparison between the first progress level of the battle-observation player and a second progress level associated with second production information for the battle between a plurality of battle players in the story game being performed by a plurality of terminal devices, and wherein battle presentation information with respect to the plurality of terminal devices of the plurality of battle players is calculated using the second production information; and calculating battle-observation presentation information with respect to the terminal device of the battle-observation player of the battle based on the first production information and input information related to the battle.

2. The non-transitory computer readable medium according to claim 1, wherein determining the second production information for the battle between the plurality of battle players, as the first production information based on the first progress level of the battle-observation player, in response to the first progress level of the battle-observation player is equal to or higher than the second progress level, in the story game, associated with the second production information for the battle between the plurality of battle players, and wherein the method further comprises determining one of a plurality of items of the first production information for the story game, each of which corresponds to the first progress level of the battle-observation player or lower, as the first production information based on the first progress level of the battle-observation player, in response to the first progress level of the battle-observation player being lower than the second progress level, in the story game, associated with the second production information for the battle between the plurality of battle players.

3. The non-transitory computer readable medium according to claim 1, wherein the method further comprises:

determining one of a plurality of items of the first production information for the story game, each of which corresponds to the first progress level of the battle-observation player or lower, as the first production information based on the first progress level of the battle-observation player.

4. The non-transitory computer readable medium according to claim 1, wherein determining the first production information is based on a lottery process or a selection by the battle-observation player.

5. The non-transitory computer readable medium according to claim 1, wherein the first production information includes at least one of background information, BGM information, video effect information, and sound effect information for the battle.

6. An information processing device for a game, the game including a story game and a battle game, a battle of the battle game being observable at the information processing device, wherein the information processing device comprises:

a display device, wherein a battle of the battle game is observable on the display device;

a processor; and a memory connected to the processor, wherein the memory comprises a program configured to perform a method comprising:

determining first production information for a battle-observation player based on a first progress level of the battle-observation player in the story game, wherein determining the first production information is based on a result of a comparison between the first progress level of the battle-observation player and a second progress level associated with second production information for the battle between a plurality of battle players in the story game being performed by a plurality of terminal devices, and wherein battle presentation information with respect to the plurality of terminal devices of the plurality of battle players is calculated using the second production information; and calculating battle-observation presentation information with respect to the information processing device of the battle-observation player of the battle based on the first production information and input information related to the battle.

7. A method for performing a game, the game including a story game and a battle game, and a battle of the battle game being observable at a terminal device of a battle-observation player, the method comprising:

determining first production information for the battle-observation player based on a first progress level of the battle-observation player in the story game, wherein determining the first production information is based on a result of a comparison between the first progress level of the battle-observation player and a second progress level associated with second production information for the battle between a plurality of battle players in the story game being performed by a plurality of terminal devices, and wherein battle presentation information with respect to the plurality of terminal devices of the plurality of battle players is calculated using the second production information; and calculating battle-observation presentation information with respect to the terminal device of the battle-observation player of the battle based on the first production information and input information related to the battle.

8. A system for performing a game, the game including a story game and a battle game, the system comprising:

a terminal device of a battle-observation player, wherein a battle of the battle game is observable at the terminal device; and a plurality of terminal devices, wherein the terminal device is configured to perform a method comprising:

determining first production information for the battle-observation player based on a first progress level of the battle-observation player in the story game, wherein determining the first production information is based on a result of a comparison between the first progress level of the battle-observation player and a second progress level associated with second production information for the battle between a plurality of battle players in the story game being performed by the plurality of terminal devices, and wherein battle presentation information with respect to the plurality of terminal devices of the plurality of battle players is calculated using the second production information; and calculating battle-observation presentation information with respect to the terminal device of the battle-observation player of the battle based on the first production information and input information related to the battle.

\* \* \* \* \*